US012729069B2

(12) United States Patent
König et al.

(10) Patent No.: US 12,729,069 B2
(45) Date of Patent: Sep. 8, 2026

(54) METHOD AND SYSTEM FOR IDENTIFYING ANOMALIES DURING OPERATION OF A CONVEYOR SYSTEM, IN PARTICULAR OF AN AIRPORT LUGGAGE CAROUSEL

(71) Applicant: Siemens Logistics GmbH, Nuremberg (DE)

(72) Inventors: Frank König, Bochum (DE); Bengt Mueck, Nuremberg (DE)

(73) Assignee: Vanderlande Logistics GmbH, Nuremberg (DE)

(*) Notice: Subject to any disclaimer, the term of this patent is extended or adjusted under 35 U.S.C. 154(b) by 166 days.

(21) Appl. No.: 18/043,379

(22) PCT Filed: Jul. 19, 2021

(86) PCT No.: PCT/EP2021/070083
§ 371 (c)(1),
(2) Date: Feb. 28, 2023

(87) PCT Pub. No.: WO2022/042942
PCT Pub. Date: Mar. 3, 2022

(65) Prior Publication Data

US 2023/0339693 A1 Oct. 26, 2023

(30) Foreign Application Priority Data

Aug. 28, 2020 (EP) .................................... 20193378

(51) Int. Cl.
*B65G 43/02* (2006.01)
*B65G 17/38* (2006.01)

(52) U.S. Cl.
CPC ............. *B65G 43/02* (2013.01); *B65G 17/38* (2013.01); *B65G 2201/0264* (2013.01); *B65G 2203/042* (2013.01)

(58) Field of Classification Search
CPC .................... B65G 43/02; B65G 17/38; B65G 2201/0264; B65G 2203/042; B65G 2203/0266; G01L 5/101
See application file for complete search history.

(56) References Cited

U.S. PATENT DOCUMENTS 5,810,158 A * 9/1998 Schiesser ............ B65G 47/268 198/460.1
8,973,742 B2 * 3/2015 Tout ...................... B65G 23/44 198/810.04

(Continued)

FOREIGN PATENT DOCUMENTS

CN 1864016 A 11/2006
CN 110271944 A 9/2019

(Continued)

OTHER PUBLICATIONS

IPSearch History Apr. 27, 2026 UTC; InnovationQ+; https://iq.ip.com/discover (Year: 2026).*

*Primary Examiner* — Gene O Crawford
*Assistant Examiner* — Abby A Jorgensen
(74) *Attorney, Agent, or Firm* — Laurence A. Greenberg; Werner H. Stemer; Ralph E. Locher

(57) ABSTRACT

Airport luggage carousels are usually operated in a run-to-failure approach that necessarily leads to failures. Anomalies are detected during operation of a conveyor system having a revolving drive chain, a drive unit and a conveyor belt. The drive chain serves to transmit force and motion from a drive unit to a conveyor belt, and has chain elements and pins connecting them. At least one of the pins is a force measurement pin that registers the forces acting thereon during movement of the drive chain. The registered forces are transmitted wirelessly to the background system together with a timestamp and/or a location stamp and an identity of the force measurement pin. The transmitted data are ana- (Continued)

lyzed in the background system and, in the event of deviations, identified as an anomaly and signaled by a notification. The measurement results are evaluated to derive maintenance measures in a targeted manner.

18 Claims, 1 Drawing Sheet

(56) References Cited

U.S. PATENT DOCUMENTS

| | | | | |
|---|---|---|---|---|
| 9,809,389 | B2 * | 11/2017 | Pauli | B65G 23/44 |
| 11,208,269 | B2 | 12/2021 | Onishi et al. | |
| 12,139,343 | B2 * | 11/2024 | Morris | B65G 43/02 |
| 2007/0056379 | A1 * | 3/2007 | Nassar | B65G 43/00<br>198/340 |
| 2007/0056386 | A1 * | 3/2007 | Kohno | G01L 5/102<br>73/828 |
| 2009/0194391 | A1 * | 8/2009 | Lagneaux | G01L 5/101<br>198/810.04 |
| 2011/0132724 | A1 * | 6/2011 | Buchkremer | B65G 43/00<br>198/500 |
| 2011/0198194 | A1 * | 8/2011 | Tokhtuev | B65G 43/02<br>198/502.1 |
| 2016/0103084 | A1 * | 4/2016 | Kleczewski | G01L 1/14<br>324/652 |
| 2018/0354726 | A1 * | 12/2018 | Kleczewski | B65G 43/02 |

FOREIGN PATENT DOCUMENTS

| | | | | |
|---|---|---|---|---|
| DE | 102018118709 | A1 * | 2/2020 | F16G 13/18 |
| JP | S5028375 | A | 3/1975 | |
| JP | 2020033164 | A * | 3/2020 | G01B 11/14 |
| WO | WO-2007012796 | A1 * | 2/2007 | G01L 5/101 |
| WO | 2019045043 | A1 | 3/2019 | |
| WO | WO-2019081698 | A1 * | 5/2019 | B65G 43/02 |
| WO | WO-2020025088 | A1 * | 2/2020 | F16G 13/06 |

* cited by examiner 4
6n+1
6n
8
8'
6n-1
8'

F
0,5
0
-0,5
500
0
-500
A
A
A
A
A
A
8a
8b
8c
X
3,3
3,7
4
4,3
4,7
5
5,3
5,7
6
6,3
6,7
7
7,3
7,7
8
8,3

METHOD AND SYSTEM FOR IDENTIFYING ANOMALIES DURING OPERATION OF A CONVEYOR SYSTEM, IN PARTICULAR OF AN AIRPORT LUGGAGE CAROUSEL

FIELD AND BACKGROUND OF THE INVENTION

The present invention relates to the technical field of conveying systems for transporting piece goods, in particular conveyor systems within an airport for items of baggage and piece goods.

A goal of any airport operator is to reduce failures in baggage handling to a minimum. In practice, this means that baggage conveyor systems are kept "alive" during operation and time-based maintenance is performed outside the operating times. Supervisory Control and Data Acquisition Systems, hereinafter referred to as SCADA systems, monitor and control technical processes by means of a computer system and are frequently used in the monitoring of airport baggage conveyor systems. SCADA allows airport and other system operators to monitor operating states of whole systems.

A SCADA system can indicate failures of sections of a conveyor system, for example, if these sections are no longer available for baggage handling. Smaller problems, such as disruptions in material flow, for example caused by wedged pieces of baggage, can be eliminated very quickly, so the relevant section can return to the normal operating state. Component failures that are caused by wear can usually not be remedied without significant effects on the availability and capacity of the system, however. These failures can result in large problems for airport and other system operators.

In order to reduce failures to a minimum, baggage conveyor systems can be controlled with what is known as preventive maintenance, which involves preventive maintenance of components at predetermined maintenance intervals. This time-based maintenance strategy is time-consuming, however. In addition, maintenance activities, which would actually not be necessary at all, are carried out on individual components. Furthermore, the wear of individual, identical components is not uniform, so some components are maintained too frequently, other components are maintained too late and, despite regular maintenance intervals, failures nevertheless occur. Due to the enormous length of conveyor systems in airports, a more precise inspection is very costly and time-intensive, and in addition, not all parts are visible, as a result of which maintenance is made more difficult and it is therefore not possible to completely prevent them despite more time- and cost-intensive maintenance. Therefore, in some conveying systems, maintenance of all components is, on average, more expensive than the damage caused by a failure.

Therefore, time-based or preventive maintenance programs are increasingly being replaced by a corrective maintenance program known as run-to-failure RTF or reactive maintenance. This reactive maintenance results in failed components, which have to be repaired or replaced during ongoing operation, and this can lead to system downtimes and contractual penalties for items of baggage delivered late. These contractual penalties are to be paid from the airport operators to the airlines. In addition, high costs arise for repair or replacement due to the sudden failure, not least because the maintenance personnel must be immediately ready for action in a manner similar to a fire department.

An airport reclaim carousel (reclaim carousel) returns the surrendered baggage to the arriving passengers. As a rule, the baggage is generally fed to the reclaim carousel by means of feed belts from above or below and then distributed to a moving revolving conveyor belt (reclaim belt). It is customary for this type of system to have two feed belts, thereby increasing the feed capacity at which the baggage is delivered to the revolving conveyor belt and thus to the passengers. The revolving conveyor belt of a reclaim carousel typically consists of a friction-operated conveyor belt which is assembled with modular units to form an endless loop. The revolving conveyor belt is typically moved by a drive chain driven by at least one drive unit.

For reasons of redundancy, reclaim carousels are typically driven by two drive units, which are connected via a free-spinning coupling (bicycle principle). A single drive unit is dimensioned such that it can drive a conveyor belt having a length of up to 75 m along the closed revolving path. Typically, rubber lamellae of the conveyor belt are 1,200 mm long and 8 mm thick. A pressed steel plate carrier or chassis is attached to each chain link at a distance of 250 mm and carries support wheels with polyurethane tires and a guide wheel for smooth, frictionless operation. Rubber lamellae and support buffers are attached to each carrier to provide a continuous support surface.

Reclaim carousels are located in the arrivals hall and their wear parts, such as rollers and rails, are concealed behind a shroud. For preventive maintenance, access, and in particular also due to the high number of parts to be inspected, is time-consuming and labor intensive.

Reclaim carousels work like conveyor belts on a closed revolving path of up to several hundred meters in length. Reclaim carousels contain two rails and approximately every half meter a polyurethane roller rolls as a transport roller on one rail each. A large airport runs up to 100 or even more such reclaim carousels. In comparison with other components used for baggage handling, reclaim carousels are very reliable during operation. For this reason, they are usually not serviced at all from cost-benefit considerations, but are operated until a failure occurs during ongoing operation.

Abrasive wear occurs when a solid object, the material of which has the same or an even greater hardness than the material of the transport rollers or of the rails. Adhesive wear occurs due to friction between surfaces of transition points. If these transition points have materials of differing hardness, the softer material is subjected to shear and is transferred as a result to the harder material.

Wear on the rails is caused by deposits attributable to high load abrasion. Abrasive wear occurs in particular when abrasive particles are additionally broken during wear. In addition, transport rollers which are blocked by an object are worn out. Blocked transport rollers, in other words, that are not rolling as intended, are exposed to severe friction and therewith to high temperatures and thus lose material. In this case, the drive chains used are likewise exposed to increased loads. The faster disruptions are identified and eliminated, the less wear there is.

SUMMARY OF THE INVENTION

It is therefore important to identify imminent failures of components of the conveyor system as early as possible so an operating failure of the conveyor system can still be prevented during the operating time and the repair can be carried out immediately at the beginning of a shutdown.

Such a maintenance strategy would be particularly important for airport and system operators, but is not yet commercially available.

Conveyor paths of other conveyor systems are also frequently driven by drive chains. Pieces of baggage are conveyed resting on lamellae on a baggage carousel. These are pulled by a drive chain in the baggage carousel. The drive chain is in turn driven by one or more drive unit(s), the drive unit (s) and the drive chain are incorporated by a chain drive.

For correct operation of the baggage conveying carousel, the drive chain must be set to a correct tension. Overtensioning results in increased forces. Insufficient tension leads to imprecise running. Both can be the cause of unnecessary wear.

The following problems, inter alia, can occur during operation. An interfering part that falls off can block rollers of the conveyor system or catch between the lamellae or other parts. The wear increases and, in particular, when an interfering part is entrained along the conveying path, damage, in particular to the running surfaces, can occur. The lamellae can become jammed, in particular in the case of overloading, as frequently occurs in the case of baggage carousels. This can result in material fatigue and even breakage of the drive chain. If people are in the vicinity, there is a risk of injury. And if a plurality of drive units are involved in the propulsion of a drive chain, the power introduced can be unevenly distributed. Thus, both the drive chain and the harder-working drive station can be overloaded. This can happen, for example, in the case of drive belt wear of a drive unit.

The prior art is checking the chain tension after installation of a conveyor system and during regular maintenance intervals. The chain tension can be checked with a spring balance. It is monitored at individual points on a stationary carousel. Dynamic additional loads (for example blocked rollers) are not ascertained. No dynamic measurement takes place during operation. Wear is looked for manually during the inspection, after it has already been formed and has possibly already resulted in damage. The entire conveying carousel has to be opened in order to find blocked wheels. This is not done for every instance of maintenance. Wear, safety risks and other problems occurring during operation are tolerated.

The previous methods for measuring the chain tension take place statically after installation or during maintenance. The forces during operation are not ascertained.

There are force measuring pins for identifying overload in quasi-static applications, for example in a crane. In these applications, an overload or a load near overload is first registered and displayed. A dynamic force measurement does not take place.

Conveyor system anomalies are thus often only identified after they have already resulted in excessive wear, damage and/or failures.

The object of the present invention is therefore to overcome the drawbacks of the prior art. This object is achieved by a method and a system having the features of the main claims. Advantageous embodiments of the invention result from the subclaims.

With regard to a method, the above-mentioned object is achieved by a method for identifying anomalies during the operation of a conveying system for transporting piece goods, for example pieces of baggage, comprising a revolving drive chain, a drive unit and a conveying section, wherein the drive chain serves for transmitting force and movement from a drive unit to a conveying section and the drive chain comprises chain links and pins connecting them, wherein at least one of the pins is a force measuring pin configured for the contactless transmission of the forces acting on it to a background system. The method has the following method steps:

a) when the drive chain is moved, the force measuring pin registers the forces acting on it;
b) the registered forces are transmitted wirelessly from the force measuring pin to the background system together with a time stamp and/or a location stamp and an identity of the force measuring pin;
c) in the background system, the data transmitted in method step b) is subjected to an analysis and identified in the event of deviations as an anomaly (A) and signaled with a message.

Since rotational speed and initial position of the force measuring pin are known, a time stamp is substantially equivalent to a location stamp, since they can be converted into one another by simple computing operations.

A force measuring pin should be taken to mean any apparatus which is capable of measuring the forces acting on it—mono- or multi-directionally—to register and transmit them to the background system, therefore. A force measuring pin, like a normal pin, connects two chain links.

The inventive solution can identify wear on components of the conveyor system before a system failure occurs and maintenance work can be started in a timely manner. Even in the case of a system failure that has already occurred, the location of the disruption can subsequently be identified on the basis of the registered forces. The inventive solution invention is suitable in particular for conveyor systems in which the drive chains are hidden and can only be inspected and repaired by opening covers. While wear can be identified at a later stage even in the case of static inspection, an overload can only be identified during operation, that is to say, in the case of a dynamic measurement. The inventive solution is therefore particularly well suited to logistics conveyor systems with piece goods of different weights and without spacing requirements, for example airport baggage carousels. The inventive solution can be used wherever a drive chain moves or drives something.

The inventive solution can be further improved by various embodiments which are advantageous in their own right respectively and can be combined with one another as desired, unless otherwise stated. These embodiments and the advantages associated therewith will be discussed in the following.

According to one embodiment, the deviations can be identified by a statistical comparison with preceding registrations or by a comparison with a fixed size. A comparison with a fixed size typically requires a calibration, on the basis of which it is determined how large the forces acting on the drive chain are during the movement of the drive chain—with or loading of the conveying path—in the case of fault-free operation. In a comparison with preceding registrations, the previous measurements serve as reference values.

In order to enable an instantaneous evaluation, so a disruption to the conveyor system is identified right at the beginning and consequential damage due to the disruption (damage due to entrained parts, increased wear, and the like) is minimized, in accordance with a further embodiment, the force measuring pin can continuously or almost continuously register the forces acting on it analogously or at a high sampling rate.

According to one embodiment, the force measuring pin can be battery-operated or can be supplied with current via cabling. Battery operation, in particular, is suitable for an airport baggage carousel; for a sorter, in particular a cabled solution.

According to one embodiment, the force measuring pin can comprise a shaft which has a Wheatstone bridge for measuring shear deformation. The Wheatstone bridge measures a double shear deformation with high accuracy and high reproducibility. A configuration of the force measuring pin that measures only a single shear stress is also possible, but with lower accuracy in the measurement of the forces, which can already be sufficient, however, depending on the application.

According to one embodiment, status data of any force measuring pin, for example a remaining battery capacity and its temperature, can be transmitted in addition to the registered forces. According to a further embodiment, when a defined battery capacity is undershot or when a certain temperature is overshot, a message can also be transmitted in accordance with at least one claim. Thus, the battery can be replaced or charged before it is empty (for example during maintenance that is being carried out anyway) and if the force measurement is dependent on status data, a higher measuring accuracy can be achieved. As a result, monitoring of the force measuring pin itself is also ensured and maintenance costs are further reduced once again.

According to one embodiment, the data can be transmitted from the force measuring pin to the background system via a gateway, with the gateway being installed at a fixed location of the conveyor system and a zero time being set at each maximum approach of the force measuring pin.

With regard to an apparatus, the above-mentioned object is achieved by a system for identifying anomalies during operation of a conveyor system for transporting piece goods, for example pieces of baggage, comprising a revolving drive chain, a drive unit and a conveying section. The drive chain is used for transmitting force and movement from a drive unit to a conveying section and the drive chain comprises chain links and pins connecting them, with at least one of the pins being a force measuring pin configured for contactless transmission of the force acting on it to a background system. The apparatus comprises means, in particular a background system, for carrying out the method as defined in the claims.

The system, insofar as it can be transferred, has analogous embodiments and the same advantages, which are specified in respect of the presented method.

According to one embodiment, the conveying section can comprise lamellae forming a conveying surface, the drive unit and the drive chain can be incorporated by a chain drive and the drive chain can be configured to pull the lamellae.

The force measuring pin can be designed to continuously or almost continuously register the forces acting on it with a high sampling rate and to transmit them to the background system. The force measuring pin can comprise a battery or be configured to be supplied with current via cabling.

According to one embodiment, the force measuring pin can comprise means for capturing status data, for example a remaining battery capacity and its temperature, and can be configured to transmit the captured status data to the background system.

According to one embodiment, the system can also comprise a gateway installed at a fixed location of the conveyor system for transmitting the registered data from the force measuring pin to the background system, with the gateway being configured to set a zero time at each maximum approach of the force measuring pin.

Embodiments of the invention will be explained in more detail, by way of example, below with reference to the figures. In the drawings:

DETAILED DESCRIPTION OF THE INVENTION

The embodiment described in detail below relates to a reclaim carousel 2. The invention is not limited to an airport baggage carousel, but is applicable to every type of conveyor systems having a revolving drive chain 4. All anomalies A which manifest themselves in a change in the chain tension can be identified, with the duration and/or severity of the change in the chain tension being dependent on the type of anomaly A.

Figure 1:
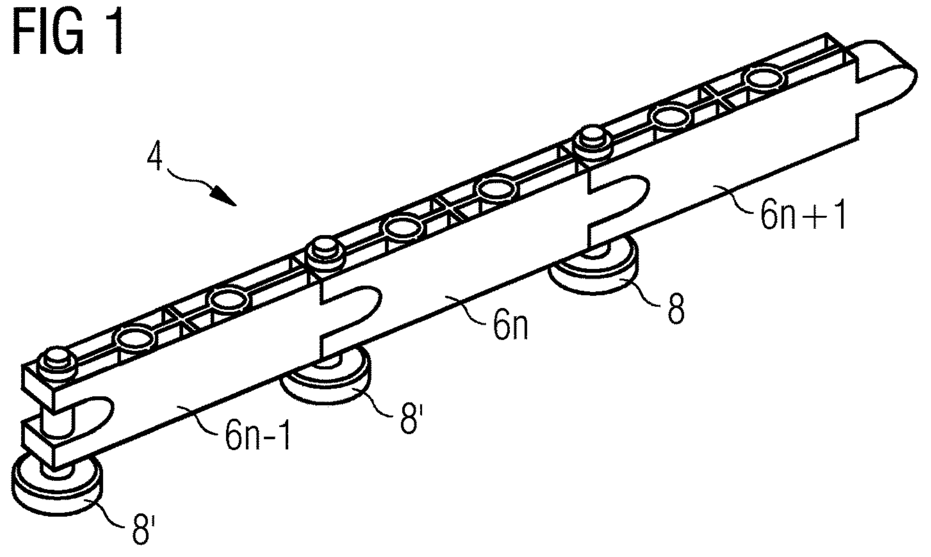
FIG. 1 shows a detail of a drive chain.

FIG. 1 shows a detail of a drive chain 4 of a baggage conveying carousel according to one embodiment of the invention. The individual chain links $6_{n-i}$, $6_n$, $6_{n+i}$ are held together by pins 8', 8. In the case of a drive chain 4, at least one of the pins 8' is a force measuring pin 8. The force measuring pin 8 measures the forces between two chain links $6_n$, $6_{n+i}$ and, during the revolution of the drive chain 4, contactlessly transmits the force which acts on the drive chain 4 and thus on the force measuring pin 8 in the direction of movement to a background system. Since the drive chain 4 is a revolving drive chain 4, the force measuring pin 8 cyclically reaches all points of the baggage conveying carousel by its movement. Any over-tensioning or under-tensioning of the drive chain 4, which are an indication of anomalies A of the conveyor system 2 to be maintained, are measured and transmitted to the background system. In order to achieve a high degree of accuracy and/or to enable an instantaneous evaluation, the force measuring pin 8 can register the forces acting on it analogously or with a high sampling or sampling rate and thus enable a continuous or almost continuous measurement. In the case of immediate transmission to the background system, which can be integrated into a SCADA system, this system can then identify anomalies A almost instantly and a maintenance worker can respond to this identified anomaly A. Maintenance can thus be planned better, depending on the type of identified anomaly, an immediate interruption of operation for maintenance can also take place in order to prevent worse damage that would otherwise occur during ongoing operation.

The background system can visualize the measured values for maintenance personnel via software, so trained employees can identify excessively high and excessively low tensioning as anomalies A and can derive suitable measures. If the baggage carousel has more than one drive unit, the distribution of the drive forces can be observed in this way.

Figure 2:
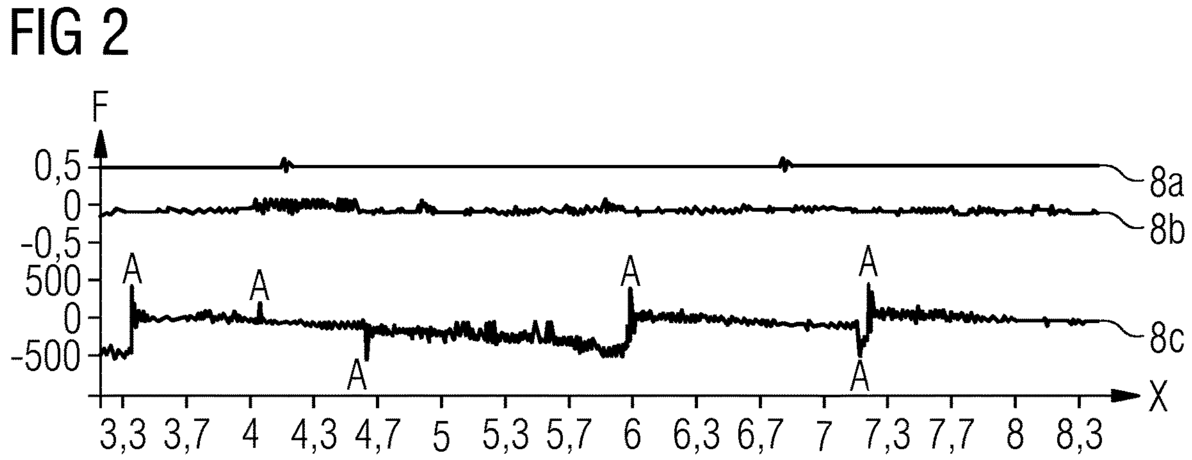
FIG. 2 shows a force diagram of force measuring pins with and without an anomaly.

FIG. 2 shows a force diagram F as a function of the location x of the measurement of different force measuring pins 8*a*, 8*b*, 8*c*. The force measuring pin 8*c* has an anomaly A, more precisely an error in a drive unit. A drive unit operates incorrectly, as a result of which the other drive unit is overloaded. Other anomalies A (faults of the friction drive, blocked rollers, states of the motor of a drive unit, track disruptions, jammed interfering parts, etc.) can be identified, with disruptions of different types being expressed in different force diagrams and it thus being possible to infer the type of anomaly A on the basis of the configuration of the force diagram.

Typically, a force measuring pin 8 comprises a rotary part, for example a hollow shaft, and an internal strain gauge for force measurement.

According to a further embodiment, the measured forces can be automatically summarized into error messages. For this purpose, in addition to the maximum registered force F and the minimally registered force F, their difference can also be identified. In addition to the triggering of maintenance instructions, a baggage carousel can thus also be protected by way of automated shutdowns from longer-term overloads (such as occur, for example, with jamming of the scales).

The deviations of the forces from the normally occurring forces are identified by a statistical comparison with preceding registrations or by a comparison with a fixed size. A comparison of the force diagrams of different force measuring pins 8 and/or different baggage carousels is also used to identify anomalies A. A trained maintenance worker with experience or a well programmed background system supplied with parameters of the baggage carousel can sometimes also identify anomalies on the basis of the force diagram of a single force measuring pin 8.

The data is transmitted from the force measuring pin 8 to the background system according to one embodiment via a gateway installed at a fixed location of the conveyor system, with a zero time being set at each maximum approach of the force measuring pin 8. The data received by the gateway, that is to say, at least the triple identity of the force measuring pin, the measured force and a time or location stamp are transmitted to the background system, for example to a Cloud, and are analyzed there by means of a signal processing server by—

- comparison with previously received triples (of the same force measuring pin 8 and/or the same measuring position);
- statistical evaluation over time. The same signal processing server can analyze the data of different baggage carousels and compare them with one another—at least when the baggage carousels have a comparable structure. If a clear deviation is identified in this analysis, a message can be transmitted to the operator with an indication of the installation and the location of the identified anomaly in order to be able to summon maintenance personnel. Further plant parameters are stored in the background system.

The force-measuring sensors 8 can preferably transmit further status data of each force measuring pin 8 in addition to the data triple, for example a remaining battery capacity and its temperature. With this additional data, the state of the force measuring pin 8 itself can thus also be monitored by the signal processing server in the background system. As a result, the availability of the proposed method and system for identifying anomalies A during operation of a conveyor system is improved once again and without significant additional effort.

Due to the dynamic detection, problems are identified more quickly and the wear is reduced. Maintenance intervals can be planned and optionally extended. Problems that occur only during ongoing operation can be identified solely by the dynamic measurement. This includes overloading and blockage of a wheel. Up to now, the additional wear and the risk of a chain crack were tolerated. Automatic evaluation of the measurement results allows the maintenance engineers to easily derive targeted maintenance measures.

LIST OF REFERENCE NUMERALS

4 drive chain
6 chain link
8 force measuring pin
8' pin
A anomaly

The invention claimed is:

1. A method for identifying anomalies during an operation of a conveyor system for transporting piece goods, the conveyor system including a revolving drive chain, a drive unit, and a conveying section, the drive chain serving to transmit a driving force from the drive unit to the conveying section, the drive chain having chain links and pins connecting the chain links;

the method comprising:

providing at least one of the pins as a force measuring pin configured for contactless transmission of mono-directional and multi-directional forces, including shear, acting on the pin to a background system;

registering the forces acting on the force measuring pin when the drive chain is moved;

wirelessly transmitting the registered forces from the force measuring pin to the background system together with at least one of a time stamp or a location stamp and an identity of the force measuring pin;

in the background system, subjecting data transmitted in the transmitting step to an analysis and, when deviations are detected, identifying the deviations as an anomaly and signaling the anomaly with a message.

2. The method according to claim 1, which comprises identifying the deviations by a statistical comparison with preceding registrations or by a comparison with a fixed value.

3. The method according to claim 1, which comprises continuously or almost continuously registering continuously the forces acting on the force measuring pin analogously or at a high sampling rate.

4. The method according to claim 1, wherein the force measuring pin is battery-operated or is supplied with current via cabling.

5. The method according to claim 1, wherein the force measuring pin comprises a shaft having a Wheatstone bridge for measuring shear deformation.

6. The method according to claim 1, which comprises transmitting status data of each force measuring pin, in addition to the registered forces.

7. The method according to claim 6, which comprises transmitting at least one of a remaining battery capacity or a temperature of the force measuring pin.

8. The method according to claim 7, which comprises, when a defined battery capacity is undershot or when a certain temperature is overshot, transmitting a corresponding a message.

9. The method according to claim 1, which comprises transmitting the data from the force measuring pin to the background system via a gateway, wherein the gateway is installed at a fixed location of the conveying system and a zero time is set at each maximum approach of the force measuring pin.

10. In a conveyor system for transporting piece goods, the conveyor system comprising a revolving drive chain, a drive unit and a conveying section, wherein the drive chain serves for transmitting force and movement from the drive unit to the conveying section and the drive chain is formed with chain links and pins connecting the chain links, a system for identifying anomalies during an operation of the conveyor system comprising:

at least one of the pins being a force measuring pin configured for a contactless transmission of the mono-directional and multi-directional forces, including shear, acting on the at least one pin to a background system; and said background system being configured to receive from said force measuring pin, by way of wireless transmission, forces acting on said force measuring pin during an operation when the drive chain is being moved, together with at least one of a time stamp or a location stamp and an identity of said force measuring pin; and said background system being configured to subject data received from said force measuring pin via the wireless transmission to an analysis and, when deviations are detected, to identify the deviations as an anomaly and to signal the anomaly by way of a message.

11. The system according to claim 10, wherein the conveying section comprises lamellae forming a conveying surface, the drive unit and the drive chain are formed by a chain drive, and the drive chain is configured to pull the lamellae.

12. The system according to claim 10, wherein said force measuring pin is configured to continuously or almost continuously register the forces acting on it with high sampling rate and to transmit the forces to the background system.

13. The system according to claim 10, wherein said force measuring pin comprises a battery.

14. The system according to claim 10, wherein said force measuring pin is configured to be supplied with current via cabling.

15. The system according to claim 10, wherein said force measuring pin comprises a shaft with a Wheatstone bridge for measuring shear deformation.

16. The system according to claim 10, wherein said force measuring pin is configured for capturing status data and to transmit the captured status data to said background system.

17. The system according to claim 16, wherein the status data to be captured are at least one of a remaining battery capacity or a temperature of said force measuring pin.

18. The system according to claim 16, further comprising a gateway installed at a fixed location of the conveyor system for transmitting the registered data from the force measuring pin to the background system, and wherein said gateway is configured to set a zero time at each maximum approach of said force measuring pin.

* * * * *